United States Patent
Chen (10) Patent No.: US 10,038,326 B2
(45) Date of Patent: Jul. 31, 2018

(54) POWER BANK WITH CHARGING MANAGEMENT INCLUDING CHARGING INTERFACE

(71) Applicant: Tianjin Synergy Groups Co., Ltd., Tianjin (CN)

(72) Inventor: Penghui Chen, Tianjin (CN)

(73) Assignee: Tianjin Synergy Groups Co., Ltd, Tianjin (CN)

( * ) Notice: Subject to any disclaimer, the term of this patent is extended or adjusted under 35 U.S.C. 154(b) by 178 days.

(21) Appl. No.: 15/132,471

(22) Filed: Apr. 19, 2016

(65) Prior Publication Data
US 2017/0244261 A1   Aug. 24, 2017

(30) Foreign Application Priority Data
Feb. 22, 2016   (CN) .......................... 2016 1 0096672

(51) Int. Cl.
*H01M 10/46*   (2006.01)
*H02J 7/00*    (2006.01)

(52) U.S. Cl.
CPC .......... *H02J 7/0026* (2013.01); *H02J 7/0021* (2013.01); *H02J 7/0047* (2013.01); *H02J 7/0081* (2013.01);
(Continued)

(58) Field of Classification Search
CPC ...... H02J 7/0021; H02J 7/0026; H02J 7/0052; H02J 7/0065; H02J 7/0091; H02J 7/0078
(Continued)

(56) References Cited

U.S. PATENT DOCUMENTS 8,614,564 B2   12/2013   Perisic et al.
9,595,843 B2    3/2017   Kim
(Continued)

FOREIGN PATENT DOCUMENTS

CN        2877107  Y    3/2007
CN      101026313  A    8/2007
(Continued)

OTHER PUBLICATIONS

Google translation of CN205565772 (Sep. 7, 2016).*
(Continued)

*Primary Examiner* — Edward Tso
(74) *Attorney, Agent, or Firm* — Hoffman Warnick LLC (57) ABSTRACT

A power bank with charging management comprises: a charging interface, a charging circuit, a rechargeable battery and a CPU. The charging interface is connected to an external power supply; the charging circuit comprises a voltage and current detecting circuit and a voltage regulating circuit; the input terminal of the voltage and current detecting circuit is connected with the charging interface, for detecting the charging voltage and the operating current of the charging circuit; the CPU is connected with the voltage and current detecting circuit and the voltage regulating circuit, for controlling the voltage regulating circuit to work at the maximum power of the power bank; the input terminal of the voltage regulating circuit is connected with the output terminal of the voltage and current detecting circuit; the output terminal of the voltage regulating circuit is connected with the rechargeable battery, for charging the rechargeable battery at the maximum power.

10 Claims, 4 Drawing Sheets

(52) U.S. Cl.
CPC .......... *H02J 7/0083* (2013.01); *H02J 7/0091* (2013.01); *H02J 2007/005* (2013.01); *H02J 2007/0062* (2013.01)

(58) Field of Classification Search
USPC ....... 320/118, 128, 135, 141, 150, 157, 162, 320/166
See application file for complete search history.

(56) References Cited

U.S. PATENT DOCUMENTS

| | | | |
|---|---|---|---|
| 2008/0258688 A1* | 10/2008 | Hussain | H02J 7/045 320/145 |
| 2014/0021922 A1* | 1/2014 | Kim | B60L 11/1812 320/111 |
| 2015/0293182 A1* | 10/2015 | Tajima | H01M 10/48 701/22 |
| 2017/0244261 A1 | 8/2017 | Chen | |

FOREIGN PATENT DOCUMENTS

| | | |
|---|---|---|
| CN | 103532212 A | 1/2014 |
| CN | 204442746 U | 7/2015 |
| CN | 204465077 U | 7/2015 |
| CN | 205565772 U | 9/2016 |
| WO | 0197360 A2 | 12/2001 |

OTHER PUBLICATIONS

International Search Report and English Translation Thereof for PCT Application No. PCT/CN2016/104174 dated Jan. 26, 2017, 6 pages.

\* cited by examiner

POWER BANK WITH CHARGING MANAGEMENT INCLUDING CHARGING INTERFACE

CROSS-REFERENCE TO RELATED APPLICATION

This application claims the benefit of Chinese Patent Application No. 201610096672.6 filed on Feb. 22, 2016 and titled "POWER BANK WITH CHARGING MANAGEMENT", which is incorporated herein by reference in its entirety.

TECHNICAL FIELD

The present disclosure relates to the field of power supply technologies, and in particular, to a power bank with charging management.

TECHNICAL BACKGROUND

With the wide use of electronic equipment, the use of power banks becomes more and more popular. The charging power of an existing power bank is determined by a charger. If the charger used is not the originally packaged charger, the related parameters of the provided charging current will be changed, or the external power supply itself will fluctuate, and the variation of the charger may cause the charging power to be higher than the power of the power bank, so that the power bank may be damaged during charging; and furthermore the fluctuation of the external power supply itself may also influence the service life of the power bank.

SUMMARY OF THE INVENTION

An embodiment of the present disclosure provides a power bank with charging management, thereby eliminating the damage on a power bank caused by a too high charging power or fluctuation of the power bank.

An embodiment of the present disclosure provides a power bank with charging management, which includes: a charging interface, a charging circuit, a rechargeable battery and a CPU;

the charging interface is configured for connecting an external power supply;

the charging circuit includes a voltage and current detecting circuit and a voltage regulating circuit; and an input terminal of the voltage and current detecting circuit is connected with the charging interface, for detecting the charging voltage and the operating current of the charging circuit;

the CPU is connected with the voltage and current detecting circuit and the voltage regulating circuit, for controlling the voltage regulating circuit to operate at a maximum power of the power bank according to the charging voltage and the operating current;

an input terminal of the voltage regulating circuit is connected with an output terminal of the voltage and current detecting circuit; and an output terminal of the voltage regulating circuit is connected with the rechargeable battery, for charging the rechargeable battery at the maximum power of the power bank.

The power bank further includes a DC converter through which the charging interface is connected with the voltage and current detecting circuit, in order to be adapted for chargers with different operating parameters.

The DC converter includes a resistor R23, a resistor R24, a resistor R26, a resistor R27, a resistor R30, a resistor R32, a resistor R33, a resistor R34, a capacitor C3, a capacitor C4, a capacitor C16, a capacitor C17, a capacitor C18, a capacitor C19, a capacitor C20, a capacitor C21, a capacitor C22, a capacitor C23, a capacitor C57, an inductor L1, an inductor L2, a bidirectional transient voltage suppressor D2, a diode D21, a voltage stabilizing diode D22, a MOS transistor Q2, a MOS transistor Q3, a MOS transistor Q11 and a gate driver U3 of model UCC27524; where, a first end of the resistor R24 is connected to PWML, a second end of the resistor R24 is connected with a first end of the resistor R32 and a pin 4 of the gate driver U3; a first end of the resistor R26 is connected to PWMH, and a second end of the resistor R26 is connected with a first end of the resistor R33 and a pin 2 of the gate driver U3; a first end of the capacitor C3, a first end of the capacitor C4, a first end of the capacitor C21, a first end of the capacitor C20 and a first end of the inductor L1 are all connected with a power supplying terminal, and a second end of the inductor L1 is connected with a first end of the capacitor C17, a first end of the capacitor C18, a first end of the capacitor C19, a first end of the capacitor C57 and a drain electrode of the MOS transistor Q11; a gate electrode of the MOS transistor Q11 is connected with first end of the resistor R30 and a first end of the resistor R34; a second end of the resistor R30 is connected with a pin 7 of the gate driver U3; a pin 6 of the gate driver U3 is connected with a detection terminal of the voltage and current detecting circuit and a first end of the capacitor C23; a second end of the capacitor C17, a second end of the capacitor C18, a second end of the capacitor C19 and a second end of the capacitor C57 are all connected with a first end of the inductor L2, a gate electrode of the MOS transistor Q3 and a source electrode of the MOS transistor Q3; a drain electrode of the MOS transistor Q3 is connected with a first end of the capacitor C16, a first end of the capacitor C22, a first end of the resistor R23, a first end of the bidirectional transient voltage suppressor D2 and the detection terminal of the voltage and current detecting circuit; a second end of the resistor R23 is connected with a cathode of the diode D21; an anode of the diode D21 is connected with a source electrode of the MOS transistor Q2; a gate electrode of the MOS transistor Q2 is connected with first end of the resistor R27 and a cathode of the voltage stabilizing diode D22; a second end of the resistor R27 and a drain electrode of the MOS transistor Q2 are both connected with the charging interface; a second end of the resistor R32, a second end of the resistor R33, a pin 1 of the gate driver U3, a second end of the capacitor C20, a second end of the capacitor C21, a second end of the capacitor C3, a second end of the capacitor C4, a second end of the capacitor C23, a second end of the resistor R34, a source electrode of the MOS transistor Q11, a second end of the inductor L2, a second end of the capacitor C16, a second end of the capacitor C22, a second end of the bidirectional transient voltage suppressor D2 and a anode of the voltage stabilizing diode D22 are all grounded.

The PWMH and the PWML are two PWM signals complementary with each other (that is, the phase of PWMH is inverse to the phase of PWML); and a parasitic diode is connected between the source electrode and the drain electrode of each of the MOS transistor Q2, the MOS transistor Q3 and the MOS transistor Q11.

The charging interface includes a reverse polarity protection circuit, and the reverse polarity protection circuit includes a charging interface J1, a diode D4, a diode D14, a diode D18, a bidirectional transient voltage suppressor D15, a resistor R3, a resistor R12, a resistor R29, a resistor R31, a resistor R84, a capacitor C43, a capacitor C44, a MOS transistor Q10, a triode Q20, a triode Q26, an electrode tube Q27; where a pin 1 of the charging interface J1 is connected with CHARGE, a first end of the bidirectional transient voltage suppressor D15, a source electrode of the MOS transistor Q10, a first end of the resistor R12, a first end of the capacitor C43 and a anode of the diode D14; a pin 2 of the charging interface J1 is connected with CHARGE-C-, a second end of the bidirectional transient voltage suppressor D15 and a first end of the resistor R3; a pin 3 of the charging interface J1 is connected with C-TEST; a second end of the resistor R12 is connected with a gate electrode of the MOS transistor Q10, a second end of the capacitor C43 and a cathode of the diode D4; a drain electrode of the MOS transistor Q10 is connected to an external power supply; a cathode of the diode D14 is connected with an anode of the diode D4 and a first end of the capacitor C44; a second end of the capacitor C44 is connected with an anode of the diode D18, an emitter electrode of the triode Q27 and an emitter electrode of the triode Q20; a cathode of the diode D18 is connected with an input terminal of the charging circuit 20; a collector electrode of the triode Q27 is connected with an input terminal of the charging circuit 20, and a base electrode of the triode Q27 is connected with a base electrode of the triode Q20, a first end of the resistor R29 and a collector electrode of the triode Q26; a second end of the resistor R29 is connected with an input terminal of the charging circuit 20; a base electrode of the triode Q26 is connected with a first end of the resistor R31 and a first end of the resistor R84; a second end of the resistor R84 is connected to PWM-C; a second end of the resistor R3, a second end of the resistor R31, an emitter electrode of the triode Q26 and a collector electrode of the triode Q20 are all grounded.

A parasitic diode is connected between the source electrode and the drain electrode of the MOS transistor Q10.

The power bank further includes a first power switch through which the charging circuit is connected with the rechargeable battery, so that the rechargeable battery may be isolated when the battery temperature of the power bank is higher than an upper value, the battery temperature is lower than a lower value, the discharging of the rechargeable battery reaches a limited value or the operating current reaches a threshold.

The power bank further includes a discharging circuit which is connected with the rechargeable battery, so that the power bank may discharge electricity while it is charged.

The power bank further includes a second power switch through which the discharging circuit is connected with the rechargeable battery, so that the rechargeable battery may be isolated when the battery temperature of the power bank is higher than an upper value, the battery temperature is lower than a lower value, the discharging of the rechargeable battery reaches a limited value or the operating current reaches a threshold.

The rechargeable battery is consisted of a plurality of battery cells connected in series; and the charging interface J1 is connected to an unstable power supply.

The power bank further includes an OLED display screen, wherein, the OLED display screen is provided on the housing of the power bank, and the OLED display screen is connected with the CPU so as to display the dump energy, the charging power, the discharging power, the battery temperature and the remaining service time in the current charging and discharging state, of the power bank.

The OLED display screen is connected with the CPU via a CAN bus.

With the power bank provided by the embodiments of the present disclosure, the voltage and current detecting circuit and the voltage regulating circuit are provided in the charging circuit of a power bank and further a CPU is provided, so that the operating parameters of the power bank are detected by the voltage and current detecting circuit during charging, and the output parameters of the voltage regulating circuit are determined by the CPU according to the operating parameters and the rated parameters of the power bank, thereby ensuring that the power bank works at the maximum power and has a stable working state, eliminating the impaction of the variation of an external current on a mobile terminal, avoiding the damage of the power bank due to a too high charging power and avoiding the influence of a varying external power supply on the service life of the power bank.

DETAILED DESCRIPTION OF THE PREFERRED EMBODIMENT

The present disclosure will be further illustrated in detail below in conjunction with the drawings and embodiments. It may be understood that, the specific embodiments described here are only used for explaining the disclosure, rather than limiting the disclosure. Additionally, it should also be noted that, for the purpose of easy description, only the structure related to the disclosure, rather than the whole structure, is shown in the drawings.

Figure 1:
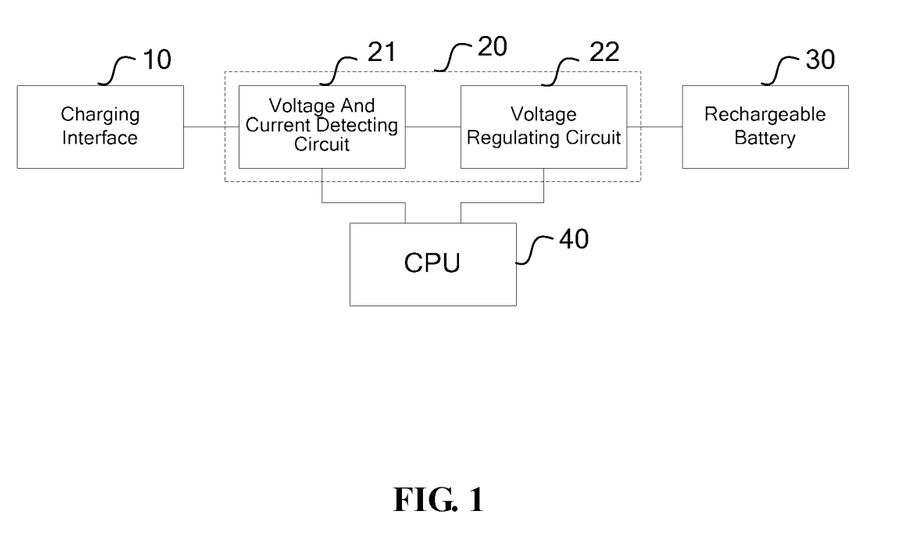
FIG. 1 is a block diagram showing the structure of a power bank with charging management according to an embodiment of the invention.

Referring to FIG. 1, FIG. 1 is a block diagram showing the structure of a power bank with charging management according to an embodiment of the invention. As shown, the power bank includes: a charging interface 10, a charging circuit 20, a rechargeable battery 30 and a CPU 40.

The charging interface 10 is configured for connecting an external power supply.

The charging circuit 20 includes a voltage and current detecting circuit 21 and a voltage regulating circuit 22; the input terminal of the voltage and current detecting circuit 21 is connected with the charging interface 10, for detecting the charging voltage and the operating current of the charging circuit 20.

The CPU 40 is connected with the voltage and current detecting circuit 21 and the voltage regulating circuit 22, for controlling the voltage regulating circuit 22 to operate at a maximum power of the power bank according to the charging voltage and the operating current;

An input terminal of the voltage regulating circuit 22 is connected with an output terminal of the voltage and current detecting circuit 21; and an output terminal of the voltage regulating circuit 22 is connected with the rechargeable battery 30, for charging the rechargeable battery 30 at the maximum power of the power bank.

A plurality of charging interfaces 10 may be provided. In addition to a commonly-used standard Micro USB interface, a standard DC044 interface may also be provided. The standard Micro USB interface may be adapted for the chargers of majority of the current intelligent mobile phones. The standard DC044 interface, in addition to the standard charger of the power bank, may be connected to the chargers of other electronic equipment that use DC044 interfaces, such as an adapter of a notebook computer.

For different chargers, current with different parameters would be inputted into the charging circuit 20. Even with the standard charger, the parameters may be fluctuated during charging due to the fluctuation of the external power supply itself. In the embodiment of present disclosure, a voltage and current detecting circuit 21 is provided to monitor the parameters in the power bank and provide a parameter support for the stable working state of the power bank.

The CPU 40 controls the variation of the operating current of the charging circuit 20 according to the detection result of the voltage and current detecting circuit 21. For example, the relationship between the variation of the operating current and the variation of the charging voltage may be determined by adjusting the operating current several times, thereby determining whether the external power supply is a constant power supply (such as a mobile phone charger and a notebook computer adapter) or a non-constant power supply (such as a solar energy charger, a wind-power generation equipment and a manual charger). Then a constant power charging mode or a constant voltage charging mode is performed accordingly. The charging circuit 20 determines whether the maximum output power of the charging equipment exceeds the acceptable maximum power of the power bank, if it does not exceed the maximum power, charging is made according to maximum power of the charging equipment, and if it exceeds the maximum power, charging is made according to the maximum power of the power bank. Thereby, the charge efficiency may be improved effectively. It is noted that the output power of the non-constant power supply (such as a solar energy charger and a wind-power generation equipment) is unstable, so that when the non-constant power supply is connected, the constant voltage charging mode is performed in order to make charging via a constant voltage. The conversion of the charging power is completely realized by the cooperation of the charging circuit 20 and the CPU 40, and hence a user does not need to select the charger.

In short, the voltage and current detecting circuit 21 and the voltage regulating circuit 22 are provided in the charging circuit 20 of the power bank, and the CPU 40 are further provided, so that the operating parameters of the power bank during charging are detected by the voltage and current detecting circuit 21, and the output parameters of the voltage regulating circuit 22 are determined by the CPU 40 according to the operating parameters and the rated parameters of the power bank, thus ensuring that the power bank works at the maximum power and has a stable working state, eliminating the affection of the variation of an external current on a mobile terminal, avoiding the damage of the power bank due to a too high charging power and avoiding the influence of a varying external power supply on the service life of the power bank.

Figure 2:
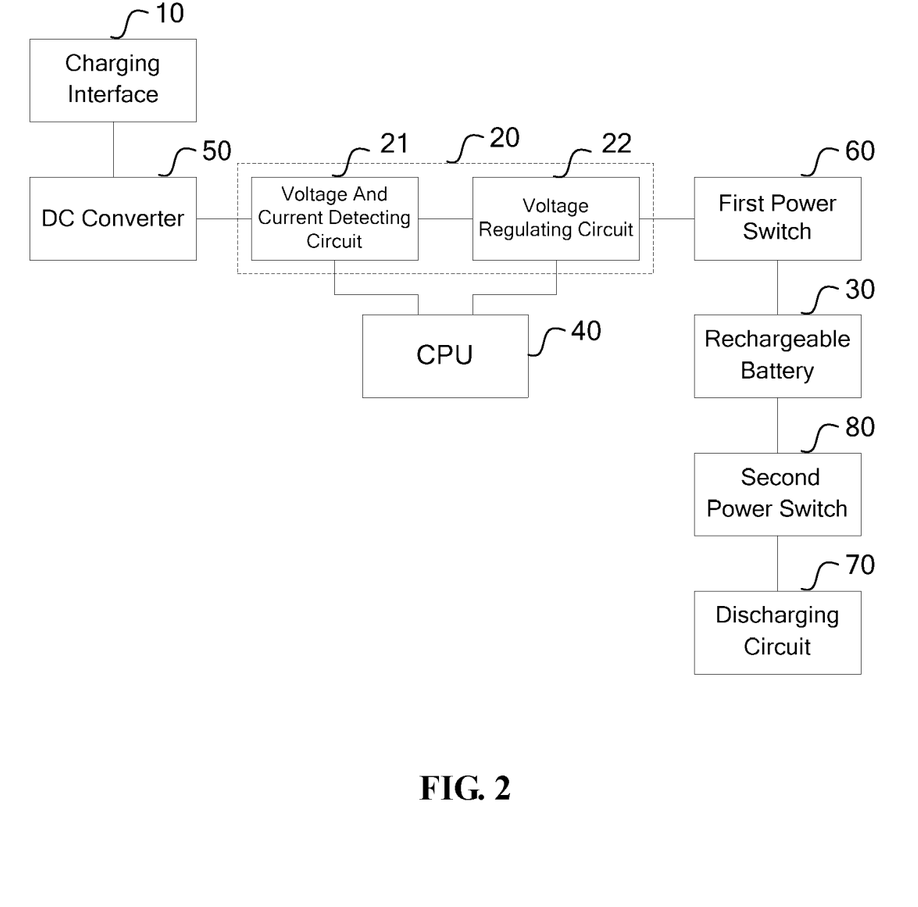
FIG. 2 is another block diagram showing the structure of a power bank with charging management according to an embodiment of the invention.

As shown in FIG. 2, the power bank further includes a DC converter 50; the charging interface 10 is connected with the voltage and current detecting circuit 21 via the DC converter 50, so as to be adapted for chargers with different operating parameters.

Figure 3:
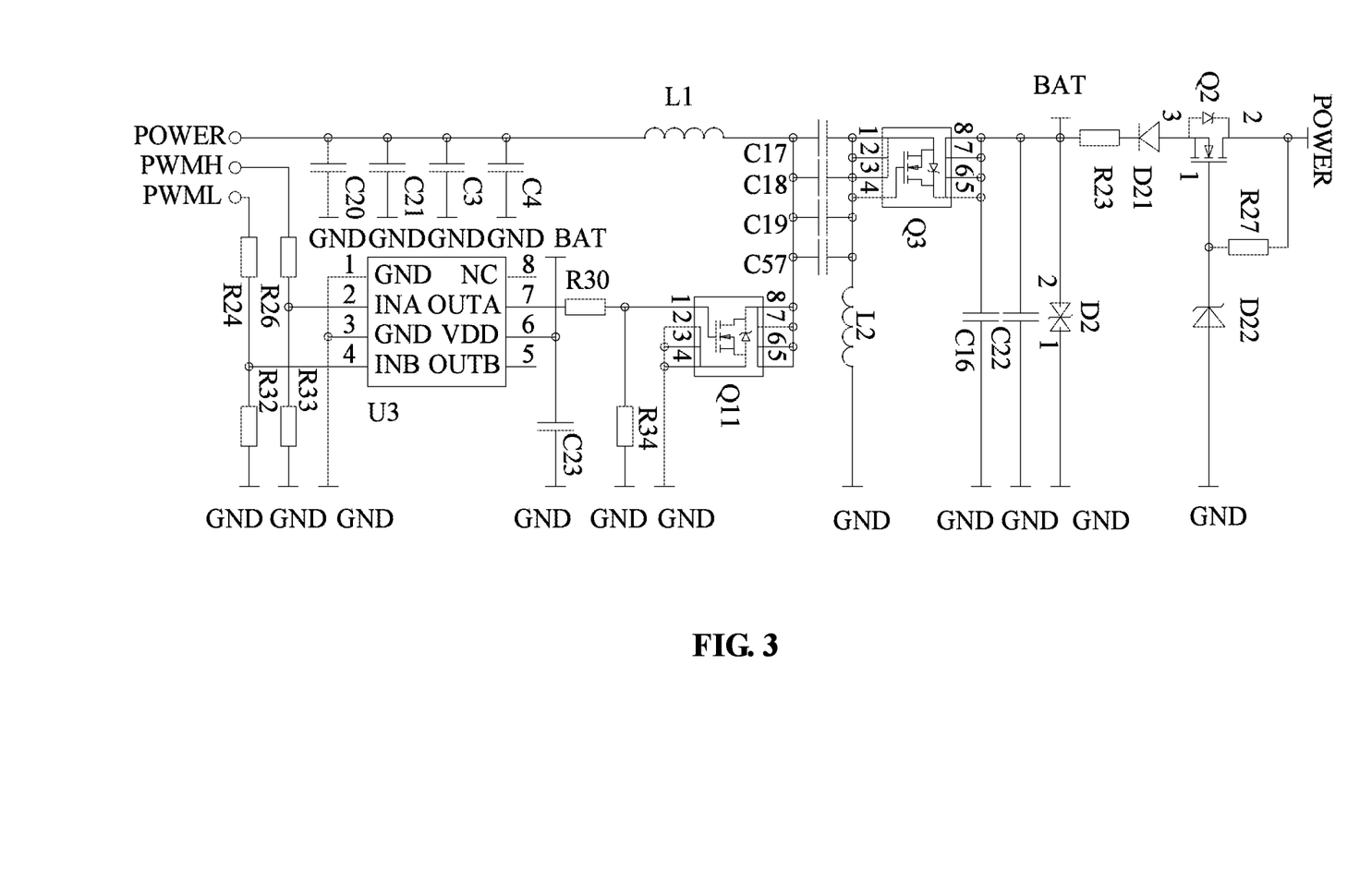
FIG. 3 is a schematic circuit diagram of a DC converter of the power bank with charging management according to an embodiment of the invention.

Moreover, as shown in FIG. 3, the DC converter 50 includes a resistor R23, a resistor R24, a resistor R26, a resistor R27, a resistor R30, a resistor R32, a resistor R33, a resistor R34, a capacitor C3, a capacitor C4, a capacitor C16, a capacitor C17, a capacitor C18, a capacitor C19, a capacitor C20, a capacitor C21, a capacitor C22, a capacitor C23, a capacitor C57, an inductor L1, an inductor L2, a bidirectional transient voltage suppressor D2, a diode D21, a voltage stabilizing diode D22, a MOS transistor Q2, a MOS transistor Q3, a MOS transistor Q11 and a gate driver U3 of model UCC27524; where, a first end of the resistor R24 is connected to PWML, a second end of the resistor R24 is connected with a first end of the resistor R32 and a pin 4 of the gate driver U3; a first end of the resistor R26 is connected to PWMH, and a second end of the resistor R26 is connected with a first end of the resistor R33 and a pin 2 of the gate driver U3; a first end of the capacitor C3, a first end of the capacitor C4, a first end of the capacitor C21, a first end of the capacitor C20 and a first end of the inductor L1 are all connected with a power supplying terminal, and a second end of the inductor L1 is connected with a first end of the capacitor C17, a first end of the capacitor C18, a first end of the capacitor C19, a first end of the capacitor C57 and a drain electrode of the MOS transistor Q11; a gate electrode of the MOS transistor Q11 is connected with first end of the resistor R30 and a first end of the resistor R34; a second end of the resistor R30 is connected with a pin 7 of the gate driver U3; a pin 6 of the gate driver U3 is connected with a detection terminal of the voltage and current detecting circuit and a first end of the capacitor C23; a second end of the capacitor C17, a second end of the capacitor C18, a second end of the capacitor C19 and a second end of the capacitor C57 are all connected with a first end of the inductor L2, a gate electrode of the MOS transistor Q3 and a source electrode of the MOS transistor Q3; a drain electrode of the MOS transistor Q3 is connected with a first end of the capacitor C16, a first end of the capacitor C22, a first end of the resistor R23, a first end of the bidirectional transient voltage suppressor D2 and the detection terminal of the voltage and current detecting circuit; a second end of the resistor R23 is connected with a cathode of the diode D21; an anode of the diode D21 is connected with a source electrode of the MOS transistor Q2; a gate electrode of the MOS transistor Q2 is connected with first end of the resistor R27 and a cathode of the voltage stabilizing diode D22; a second end of the resistor R27 and a drain electrode of the MOS transistor Q2 are both connected with the charging interface; a second end of the resistor R32, a second end of the resistor R33, a pin 1 of the gate driver U3, a second end of the capacitor C20, a second end of the capacitor C21, a second end of the capacitor C3, a second end of the capacitor C4, a second end of the capacitor C23, a second end of the resistor R34, a source electrode of the MOS transistor Q11, a second end of the inductor L2, a second end of the capacitor C16, a second end of the capacitor C22, a second end of the bidirectional transient voltage suppressor D2 and an anode of the voltage stabilizing diode D22 are all grounded.

The PWMH and the PWML are two PWM signals complementary with each other; and a parasitic diode is connected between the source electrode and the drain electrode of each of the MOS transistor Q2, the MOS transistor Q3 and the MOS transistor Q11.

In the present embodiment, the charging circuit is an SEPIC power supply controlled by the CPU. The CPU internally performs the functions of charging circuit input voltage and current, acquiring output voltage, a PID control, maximum power searching and tracking control and PWM output. The PID control includes constant input power control (which restricts the input maximum power), constant output voltage control (which restricts the output voltage to prevent the battery from being overcharged). These control functions may work simultaneously, and the control function that has the minimum output result is effective.

When a charger or other power supplies (for example, power supplies with a voltage of 4.5V-80V, such as a power adapter or a solar energy battery, etc.) is connected, the output current of the charging circuit increases gradually, and when the input power reaches its maximum value, it charges the battery with the maximum input power.

The power supplies with a voltage range of 4.5V-80V may charge the power bank. When the input power of the power supply is less than the power of the power bank, the charging is made using the maximum power of the input power supply. Otherwise, the charging is made using the maximum power of the power bank. However, in the case that a solar energy battery is connected, a maximum power point of the solar energy battery is automatically tracked, so that the solar energy battery can be maximally utilized.

Figure 4:
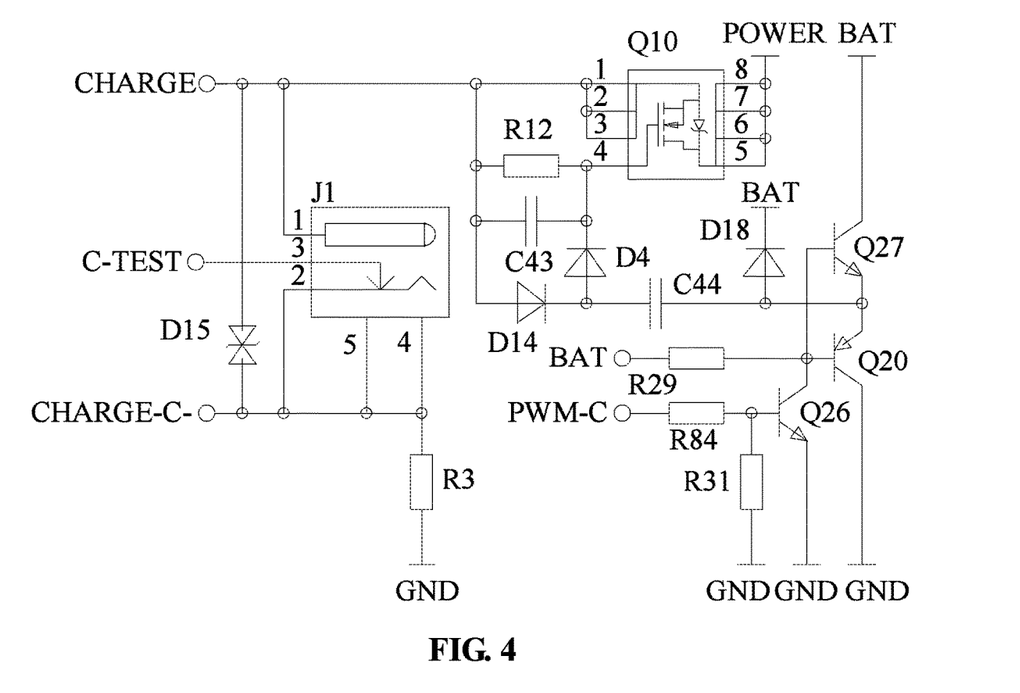
FIG. 4 is a schematic circuit diagram of a reverse polarity protection circuit of the power bank with charging management according to an embodiment of the invention.

As shown in FIG. 4, the charging interface 10 includes a reverse connection-proof circuit, where the reverse connection-proof circuit includes a charging interface J1, a diode D4, a diode D14, a diode D18, a bidirectional transient voltage suppressor D15, a resistor R3, a resistor R12, a resistor R29, a resistor R31, a resistor R84, a capacitor C43, a capacitor C44, a MOS transistor Q10, a triode Q20, a triode Q26 and an electrode tube Q27; where a pin 1 of the charging interface J1 is connected with CHARGE, a first end of the bidirectional transient voltage suppressor D15, a source electrode of the MOS transistor Q10, a first end of the resistor R12, a first end of the capacitor C43 and an anode of the diode D14; a pin 2 of the charging interface J1 is connected with CHARGE-C-, a second end of the bidirectional transient voltage suppressor D15 and a first end of the resistor R3; a pin 3 of the charging interface J1 is connected with C-TEST; a second end of the resistor R12 is connected with a gate electrode of the MOS transistor Q10, a second end of the capacitor C43 and a cathode of the diode D4; a drain electrode of the MOS transistor Q10 is connected to an external power supply; a cathode of the diode D14 is connected with an anode of the diode D4 and a first end of the capacitor C44; a second end of the capacitor C44 is connected with an anode of the diode D18, an emitter electrode of the triode Q27 and an emitter electrode of the triode Q20; a cathode of the diode D18 is connected with an input terminal of the charging circuit 20; a collector electrode of the triode Q27 is connected with an input terminal of the charging circuit 20, and a base electrode of the triode Q27 is connected with a base electrode of the triode Q20, a first end of the resistor R29 and a collector electrode of the triode Q26; a second end of the resistor R29 is connected with an input terminal of the charging circuit 20; a base electrode of the triode Q26 is connected with a first end of the resistor R31 and a first end of the resistor R84; a second end of the resistor R84 is connected to PWM-C; a second end of the resistor R3, a second end of the resistor R31, an emitter electrode of the triode Q26 and a collector electrode of the triode Q20 are all grounded.

A parasitic diode is connected between the source electrode and the drain electrode of the MOS transistor Q10.

When the MOS transistor Q10 is not turned on, it is equivalent to a diode. If the polarity is reversed, the MOS transistor Q10 blocks the current, so that no current flows reversely from the charging interface J1, and hence the charging circuit will not be damaged. When an input voltage (greater than 4.3V) is detected at the charging interface J1, a square wave with a frequency of 20 KHz and a duty ratio of 50% will be outputted from the pin PWM-C. Then, under the driving of the triode Q20, the triode Q26 and the triode Q27, the MOS transistor Q10 is turned on by obtaining a voltage between the gate electrode and the source electrode of the MOS transistor Q10 through coupling of the capacitor C44 and multivoltage rectification of the capacitor C43, the diode D4 and the diode D14. When a single-chip microcomputer detects that the voltage at the charging interface J1 is less than 4.3V, the single-chip microcomputer stops outputting the square wave, and thus the MOS transistor Q10 is closed.

In the case that only one diode is used, the circuit is very simple, but the power consumption during operating is large. If the input current is 2 A, then the voltage drop of a 150V Schottky diode is about 0.75V, and the power consumption will be 1.5 W. In the case that the diode is replaced with a field effect transistor, the field effect transistor is turned on during normal operation, so that the on-state internal resistance of the 150V field effect transistor is about 72 mΩ, and if the input current is 2 A, then the power consumption will be 20.7 mW.

To further improve the adaptability to various chargers, a DC converter 50 is provided on the back end of the charging interface 10. The DC converter 50 may be adapted for a wide voltage range formed by various chargers, thereby ensuring a stable charging voltage, a stable operating current and a stable charging power in the power bank, especially in the charging circuit 20. Therefore, it is necessary to improve the adaptability to various chargers with different working parameters.

As shown in FIG. 2, the power bank further includes a first power switch 60, and the charging circuit 20 is connected with the rechargeable battery 30 via the first power switch 60, so that the rechargeable battery 30 may be isolated when the battery temperature of the power bank is higher than an upper value, the battery temperature is lower than a lower value, the discharging of the rechargeable battery 30 reaches a limited value or the operating current reaches a threshold.

In the case that the rechargeable battery 30 is possible to be damaged, the first power switch 60 is turned off, and the rechargeable battery 30 is isolated from the outside, thus preventing the rechargeable battery 30 being damaged.

Moreover, as shown in FIG. 2, the power bank further includes a discharging circuit 70, and the discharging circuit 70 is connected with the rechargeable battery 30, so that the power bank discharges to the outside while it is charged.

In the prior art, the charging circuit 20 and the discharging circuit 70 of a power bank is connected with a rechargeable battery 30 via the same interface, so that the charging process and the discharging process cannot be performed at the same time. However, in the embodiment of the disclosure, the discharging circuit 70 and the charging circuit 20 are formed of different operating circuits, respectively, thus simultaneously realizing the discharging process and the charging process. As such, the efficiency can be improved in the case that a user does not have enough time.

Also, as shown in FIG. 2, the power bank further includes a second power switch 80, and the discharging circuit 70 is connected with the rechargeable battery 30 via the second power switch 80, so that the rechargeable battery 30 may be isolated when the battery temperature of the power bank is higher than an upper value, the battery temperature is lower than a lower value, the discharging of the rechargeable battery 30 reaches a limited value or the operating current reaches a threshold.

The design objective of the second power switch 80 is the same as that of the first power switch 60, except that the second power switch 80 is configured for isolating the rechargeable battery 30 from the discharging circuit 70.

The rechargeable battery 30 is consisted of a plurality of battery cells connected in series; and the charging interface J1 is connected to an unstable power supply.

In the prior art, battery cells are all connected in parallel, leading to a low charging power. In the embodiment of the present disclosure, the battery cells are connected in series, thus greatly improving the charging power. A power supply with a large power, for example, a 42.9 W power supply, may be charged fully at 1.5 hours at the soonest. An unstable power supply refers to the above non-constant power supply (such as a solar energy charger or a wind-power generation equipment). In such a power supply, the generation speed of the electrical energy will be unstable since the source of the energy is unstable. With the embodiment of the present disclosure, the impact of electrical energy variation on the charging equipment and the power bank can be reduced, and hence the service lives thereof can be prolonged. Furthermore, the power bank can be charged by all power supplies with a voltage range of 4.5V-80V. When the input power of the power supply is less than the power of the power bank, the charging process is performed at the maximum power of the input power supply. Otherwise, the charging process is performed at the maximum power of the power bank. However, in the case that an unstable power supply is connected, the maximum power point of the unstable power supply is automatically tracked, thus maximally utilizing the unstable power supply. The power bank further includes an OLED display screen which is disposed on the housing of the power bank, and the OLED display screen is connected with the CPU 40 for displaying the dump energy, the charging power, the discharging power, the battery temperature and the remaining service time in the current charging and discharging state, of the power bank.

The OLED display screen has high sharpness and low power consumption, and it is connected with the CPU 40 via a Controller Area Network (CAN) bus. Other buses such as Serial Peripheral Interface (SPI) bus may also be used. The OLED display screen may display real-time battery quantity, charging power, discharging power, battery temperature, estimated remaining running time, and other function setting menus, to provide more parameter information to a client. It should be noted that, in the present embodiment, the battery quantity is not obtained by collecting the voltage of the rechargeable battery 30 and further approximately determining the capacity of the rechargeable battery 30 via voltage comparison. In fact, the capacity of the rechargeable battery 30 may be attenuated over time, and hence the initial capacity cannot be recovered, that is a deviation of the electric quantity display will occur, so that a user cannot accurately know the true capacity of the battery, resulting in an insufficient charging or inadequate electric quantity in use. In the present embodiment, the voltage and current are acquired during charging process and discharging process, so that the input energy and the output energy are calculated, thus accurately calculating the capacity of the rechargeable battery 30. Regardless of whether the battery is a new one or an old one, the absolute value of the dump energy, rather than the relative value with respect to the initial capacity, can be calculated. Therefore, direct and accurate battery information can be provided to the user, facilitating usage of the battery by the user.

It should be noted that, the above description only shows some preferred embodiments of the disclosure and the technical principles employed. It will be understood by one skilled in the art that the disclosure is not limited to the specific embodiments described herein, and various apparent variations, rearrangements and substitutions can be made without departing from the protection scope of the disclosure. Therefore, although the disclosure has been illustrated in detail by the above embodiments, the disclosure is not limited to the above embodiments, and many other equivalent embodiments may also be included without departing from the concept of the disclosure. The scope of the disclosure should be defined by the scope of the appended claims.

The invention claimed is:

1. A power bank with charging management, comprising: a charging interface, a charging circuit, a rechargeable battery and a Central Processing Unit (CPU); wherein
    the charging interface is configured for connecting an external power supply;
    the charging circuit comprises a voltage and current detecting circuit and a voltage regulating circuit; an input terminal of the voltage and current detecting circuit is connected with the charging interface, for detecting the charging voltage and the operating current of the charging circuit;
    the CPU is connected with the voltage and current detecting circuit and the voltage regulating circuit, for controlling the voltage regulating circuit to operate at a maximum power of the power bank according to the charging voltage and the operating current;
    an input terminal of the voltage regulating circuit is connected with an output terminal of the voltage and current detecting circuit; an output terminal of the voltage regulating circuit is connected with the rechargeable battery, for charging the rechargeable battery at the maximum power of the power bank.

2. The power bank according to claim 1, further comprising: a DC converter through which the charging interface is connected with the voltage and current detecting circuit, so that the power bank is adapted for chargers with various operating parameters.

3. The power bank according to claim 2,
    wherein, the DC converter comprises a resistor R23, a resistor R24, a resistor R26, a resistor R27, a resistor R30, a resistor R32, a resistor R33, a resistor R34, a capacitor C3, a capacitor C4, a capacitor C16, a capacitor C17, a capacitor C18, a capacitor C19, a capacitor C20, a capacitor C21, a capacitor C22, a capacitor C23, a capacitor C57, an inductor L1, an inductor L2, a bidirectional transient voltage suppressor D2, a diode D21, a voltage stabilizing diode D22, a MOS transistor Q2, a MOS transistor Q3, a MOS transistor Q11 and a gate driver U3;
    wherein a first end of the resistor R24 is connected to a low pulse width modulation (PWML) signal, and a second end of the resistor R24 is connected with a first end of the resistor R32 and a pin 4 of the gate driver U3;
    a first end of the resistor R26 is connected to a high pulse width modulation (PWMH) signal, and a second end of the resistor R26 is connected with a first end of the resistor R33 and a pin 2 of the gate driver U3;
    a first end of the capacitor C3, a first end of the capacitor C4, a first end of the capacitor C21, a first end of the capacitor C20 and a first end of the inductor L1 are all connected with a power supplying terminal, and a second end of the inductor L1 is connected with a first end of the capacitor C17, a first end of the capacitor C18, a first end of the capacitor C19, a first end of the capacitor C57 and a drain electrode of the MOS transistor Q11; a gate electrode of the MOS transistor Q11 is connected with a first end of the resistor R30 and a first end of the resistor R34;

a second end of the resistor R30 is connected with a pin 7 of the gate driver U3;

a pin 6 of the gate driver U3 is connected with a detection terminal of the voltage and current detecting circuit and a first end of the capacitor C23;

a second end of the capacitor C17, a second end of the capacitor C18, a second end of the capacitor C19 and a second end of the capacitor C57 are all connected with a first end of the inductor L2, a gate electrode of the MOS transistor Q3 and a source electrode of the MOS transistor Q3;

a drain electrode of the MOS transistor Q3 is connected with a first end of the capacitor C16, a first end of the capacitor C22, a first end of the resistor R23, a first end of the bidirectional transient voltage suppressor D2 and the detection terminal of the voltage and current detecting circuit;

a second end of the resistor R23 is connected with a cathode of the diode D21;

an anode of the diode D21 is connected with a source electrode of the MOS transistor Q2;

a gate electrode of the MOS transistor Q2 is connected with a first end of the resistor R27 and a cathode of the voltage stabilizing diode D22; a second end of the resistor R27 and a drain electrode of the MOS transistor Q2 are both connected with the charging interface;

a second end of the resistor R32, a second end of the resistor R33, a pin 1 of the gate driver U3, a second end of the capacitor C20, a second end of the capacitor C21, a second first end of the capacitor C3, a second end of the capacitor C4, a second end of the capacitor C23, a second end of the resistor R34, a source electrode of the MOS transistor Q11, a second end of the inductor L2, a second end of the capacitor C16, a second end of the capacitor C22, a second end of the bidirectional transient voltage suppressor D2 and an anode of the voltage stabilizing diode D22 are all grounded;

wherein, the PWMH signal and the PWML signal are PWM signals complementary with each other;

a parasitic diode is connected between the source electrode and the drain electrode of each of the MOS transistor Q2, the MOS transistor Q3 and the MOS transistor Q11.

4. The power bank according to claim 1, wherein, the charging interface comprises a reverse polarity protection circuit, and the reverse polarity protection circuit comprises a charging interface J1, a diode D4, a diode D14, a diode D18, a bidirectional transient voltage suppressor D15, a resistor R3, a resistor R12, a resistor R29, a resistor R31, a resistor R84, a capacitor C43, a capacitor C44, a MOS transistor Q10, a triode Q20, a triode Q26 and an electrode tube Q27;

wherein, a pin 1 of the charging interface J1 is connected with an interface CHARGE, a first end of the bidirectional transient voltage suppressor D15, a source electrode of the MOS transistor Q10, a first end of the resistor R12, a first end of the capacitor C43 and an anode of the diode D14;

a pin 2 of the charging interface J1 is connected with an interface CHARGE-C-, a second end of the bidirectional transient voltage suppressor D15 and a first end of the resistor R3;

a pin 3 of the charging interface J1 is connected with an interface C-TEST;

a second end of the resistor R12 is connected with a gate electrode of the MOS transistor Q10, a second end of the capacitor C43 and a cathode of the diode D4;

a drain electrode of the MOS transistor Q10 is connected to an external power supply;

a cathode of the diode D14 is connected with an anode of the diode D4 and a first end of the capacitor C44;

a second end of the capacitor C44 is connected with an anode of the diode D18, an emitter electrode of the triode Q27 and an emitter electrode of the triode Q20;

a cathode of the diode D18 is connected with an input terminal of the charging circuit;

a collector electrode of the triode Q27 is connected with the input terminal of the charging circuit;

a base electrode of the triode Q27 is connected with the base electrode of the triode Q20, a first end of the resistor R29 and a collector electrode of the triode Q26;

a second end of the resistor R29 is connected with the input terminal of the charging circuit;

a base electrode of the triode Q26 is connected with a first end of the resistor R31 and a first end of the resistor R84;

a second end of the resistor R84 is connected to an interface PWM-C;

a second end of the resistor R3, a second end of the resistor R31, an emitter electrode of the triode Q26 and the collector electrode of the triode Q20 are all grounded;

wherein a parasitic diode is connected between the source electrode and the drain electrode of the MOS transistor Q10.

5. The power bank according to claim 1, further comprising: a first power switch through which the charging circuit is connected with the rechargeable battery, so that the rechargeable battery is isolated when the battery temperature of the power bank is higher than an upper value, the battery temperature is lower than a lower value, the discharging of the rechargeable battery reaches a limited value or the operating current reaches a threshold.

6. The power bank according to claim 5, further comprising: a discharging circuit which is connected with the rechargeable battery, so that the power bank discharges electricity while it is charged.

7. The power bank according to claim 6, further comprising: a second power switch through which the discharging circuit is connected with the rechargeable battery, so that the rechargeable battery is isolated when the battery temperature of the power bank is higher than an upper value, the battery temperature is lower than a lower value, the discharging of the rechargeable battery reaches a limited value or the operating current reaches a threshold.

8. The power bank according to claim 4, wherein, the rechargeable battery is consisted of a plurality of battery cells connected in series; and the charging interface J1 is connected to an unstable power supply.

9. The power bank according to claim 1, further comprising: an Organic Light-Emitting Diode (OLED) display screen, wherein, the OLED display screen is provided on the housing of the power bank, and the OLED display screen is connected with the CPU so as to display dump energy, a charging power, a discharging power, a battery temperature and remaining service time in a current charging and discharging state, of the power bank.

10. The power bank according to claim 9, wherein, the OLED display screen is connected with the CPU via a Controller Area Network (CAN) bus.

* * * * *